US008020044B2

(12) United States Patent
Martinov

(10) Patent No.: US 8,020,044 B2
(45) Date of Patent: Sep. 13, 2011

(54) DISTRIBUTED BATCH RUNNER

(75) Inventor: Dan Alexandru Martinov, Mississauga (CA)

(73) Assignee: Bank of America Corporation, Charlotte, NC (US)

( * ) Notice: Subject to any disclaimer, the term of this patent is extended or adjusted under 35 U.S.C. 154(b) by 61 days.

(21) Appl. No.: 12/627,537

(22) Filed: Nov. 30, 2009

(65) Prior Publication Data

US 2011/0093744 A1    Apr. 21, 2011

Related U.S. Application Data

(60) Provisional application No. 61/251,917, filed on Oct. 15, 2009.

(51) Int. Cl.
*G06F 11/00* (2006.01)
(52) U.S. Cl. ......................................................... 714/25
(58) Field of Classification Search .................... 714/36, 714/37, 38.1, 45, 46, 57
See application file for complete search history.

(56) References Cited

U.S. PATENT DOCUMENTS

| | | | |
|---|---|---|---|
| 6,279,124 B1 * | 8/2001 | Brouwer et al. | 714/38.11 |
| 6,304,982 B1 * | 10/2001 | Mongan et al. | 714/38.14 |
| 6,581,169 B1 * | 6/2003 | Chen et al. | 714/47.1 |
| 7,020,797 B2 * | 3/2006 | Patil | 714/4.4 |
| 7,831,865 B1 * | 11/2010 | Sears | 714/38.1 |
| 7,895,565 B1 * | 2/2011 | Hudgons et al. | 717/106 |
| 2003/0126517 A1 * | 7/2003 | Givoni et al. | 714/46 |
| 2009/0307763 A1 * | 12/2009 | Rawlins et al. | 726/5 |

* cited by examiner

*Primary Examiner* — Nadeem Iqbal
(74) *Attorney, Agent, or Firm* — Banner & Witcoff, Ltd.; Michael Springs

(57) ABSTRACT

Method and systems for allocating test scripts across a plurality of test machines is described. A set of test scripts may be maintained where the set of test scripts includes a plurality of test scripts for allocation to a plurality of test machines. A first request for a first test script task may be received from a first test machine of a plurality of test machines. A determination may be made as to whether each test script within the set of test scripts has been allocated. If not, a first unallocated test script to allocate to the first test machine may be determined, and a first test script task may be allocated to the first test machine where the first test script task includes the first unallocated test script. The first unallocated test script then may be identified as an allocated test script in the set of test scripts.

16 Claims, 5 Drawing Sheets

DISTRIBUTED BATCH RUNNER

RELATED APPLICATION

This application claims priority from U.S. Provisional Patent Application Ser. No. 61/251,197, filed Oct. 15, 2009, entitled, "Distributed Batch Runner," the contents of which are hereby incorporated by reference in its entirety.

ABSTRACT

Aspects of the disclosure relate to an electronic platform for executing test scripts over a group of machines accessible over a network.

BACKGROUND

Currently, automated tests are chosen from a list of files and launched by a human operator on each of the machines allocated to the effort of testing. These machines have to be supervised so when one test is finished, another one may be launched by the operator. The results of the tests have to be collected and analyzed by the operator in order to decide if a finished test needs to be re-run. As the operator is working on or with respect to one machine, one or more of the other machines may be idle.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure facilitate the process of running automated tests of software applications concurrently on multiple machines by splitting the lists of tasks in real time. Aspects described herein minimize the machine idle time. Aspects of the present disclosure automate the process of organizing the test results and scale up without limitation when the amount of tests needing to be run in a certain amount of time is increasing.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

Figure 1:
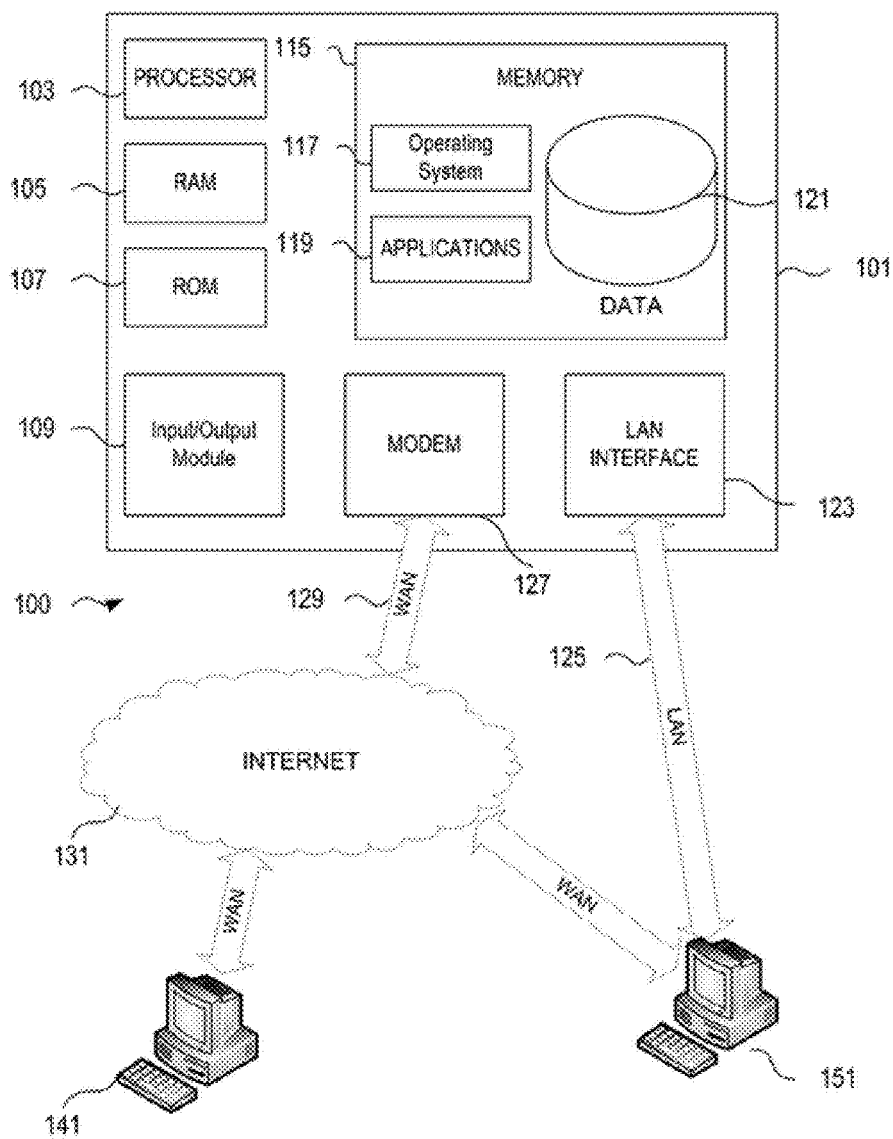
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 110 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
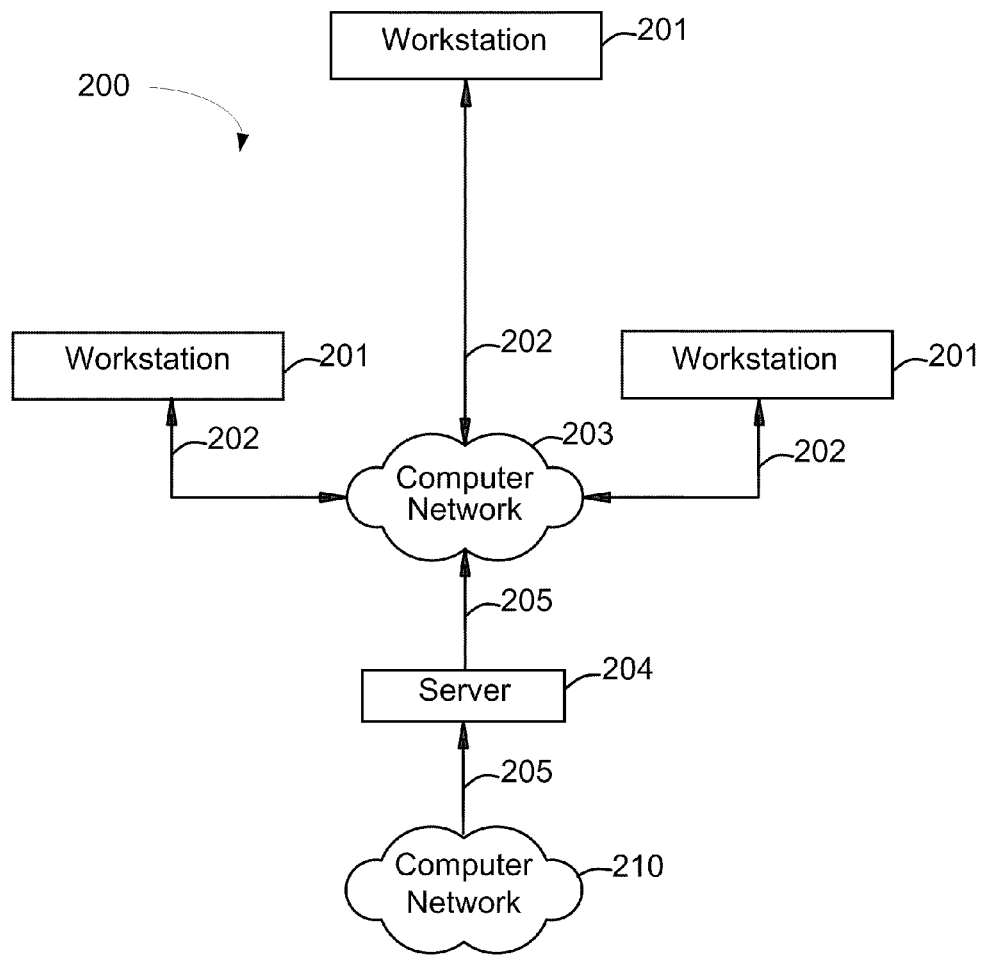
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Aspects of the present disclosure describe a system and method that handles the distribution of testing taskings and makes the decisions of what tests are to be run and where. Aspects of the present disclosure allow for the running of the scripts unattended.

Aspects of the present disclosure distributing the execution of automated test scripts on a group of machines, as opposed to one machine. When one machine becomes available, it may start executing the next available script. Such a system eliminates the need for portioning the set of automated test scripts for each machine, reduces the effort in maintaining the machines running, enforces the established process by having it implemented in the script, and reduces human error in sorting through the results.

Aspects of the present disclosure address the manual process of having an operator decide which test needs to be run next and which machine is available. For example, when running 300 scripts over a set of 20 machines, such a process is very time consuming and could be wrought with human error. Other aspects of the present disclosure eliminate the idle machine time that is lost while an operator is working on analyzing test results.

Aspects of the present disclosure use a central repository to synchronize a pool of machines allocated to cooperatively run a defined set of tests. In one embodiment, the central repository may be the HP Quality Centre product, an enterprise product supporting many quality assurance activities, such as defect tracking, test case repository, and business requirements repository. Aspects of the present disclosure offer the advantages of being an already serviced enterprise repository and offering a familiar user interface to testing and development teams in an entity.

A test machine may be configured to participate in a pool of machines that cooperatively run a test set by running one or more aspects of the present disclosure to point to a desired test set defined in a QC. A machine may be attached or detached from a pool independently of other machines participating in the execution pool, offering flexibility in scaling up or down the processing power used to run a certain test set. The protocol of machine cooperation may be implemented in accordance with one or more aspects described herein. This protocol may be the set of logical rules necessary to keep track in a common repository, such as a QC, of the execution status of each of the tests. This protocol may insure the stability of the test run even in the case of machine failures.

After launching, a certain machine may first connect to a QC and look up its desired test set to participate in. Then, it may look up for the first job needing to be run that is not being run by other machines. The machine may reserve the job so no other machine will pick it up too. The machine then may start the execution of the test job. The results of the run may be saved on a repository configured centrally for the test set. Aspects of the present disclosure described herein include a method for parsing the results looking for any failures of the test. If the test had no failures, the test may be marked in the central repository as such and it does not require any human attention any more. If any failures are detected during the run, the test may be marked as needing attention. Only then may a human operator need to read the results to confirm the errors. After finishing with a test, one or more parts of the process may be repeated. Each machine following the same protocol is creating the effect of distributing test jobs among the dedicated pool of machines, the jobs being pulled by the active machines and not pushed from the central repository.

Operation of distributed test execution may be performed mainly through a QC user interface. The operator may have a real time view of the past and current activity in a pool of machines and may direct the re-execution of any tests from there, update the contents of a test set even while in execution, and/or pause or restart a whole pool of machines. Such may be useful when known problems with the application under test would make testing temporarily irrelevant. The attaching/detaching of a machine to/from a test pool may be done by accessing the console of the machine, physically or by remotely connecting to the respective machine. Such machines participating in a test execution may not be dedicated to executions only. They may be able to serve other purposes, like code development, if desired.

Figure 3:
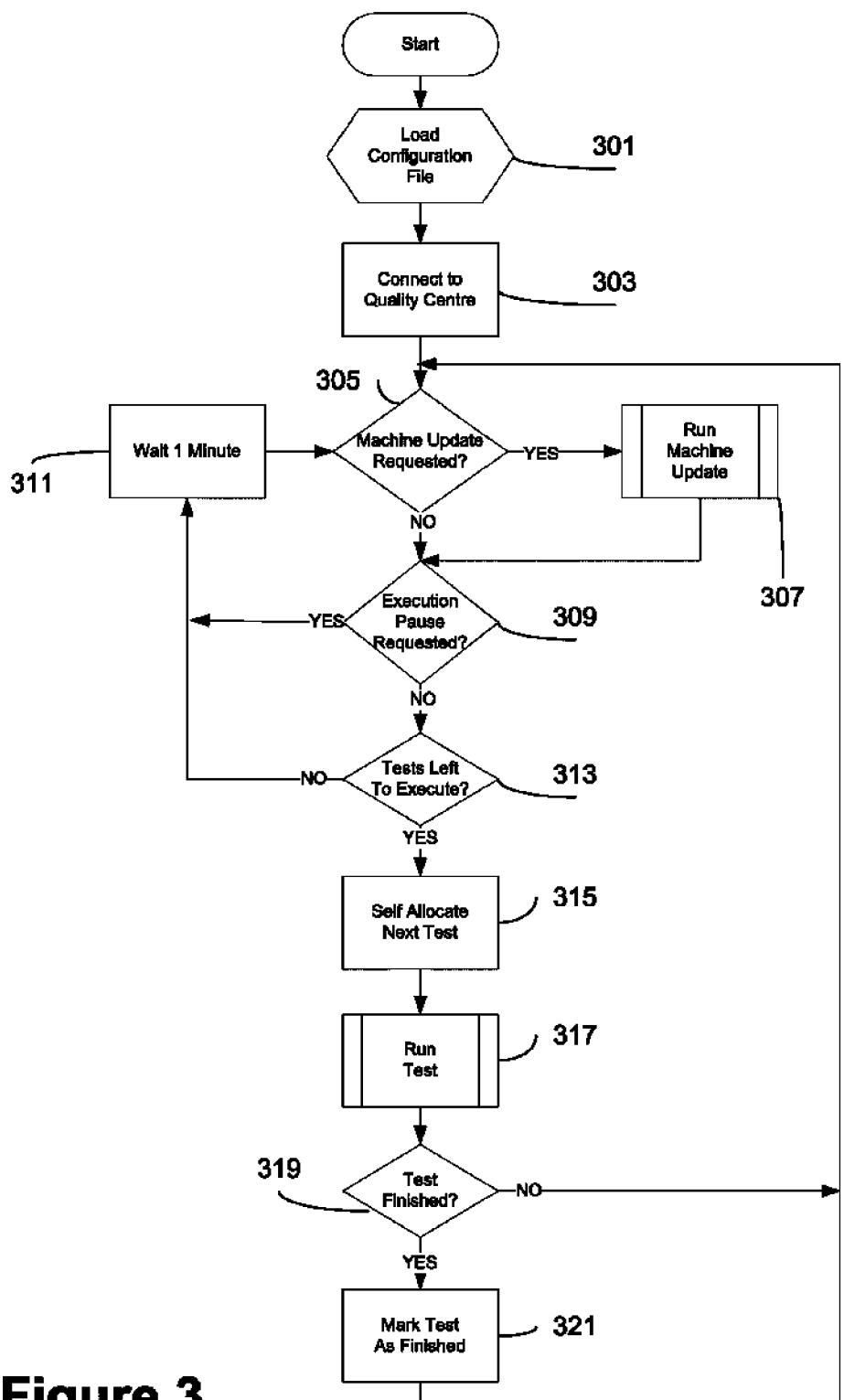
FIG. 3 is a flowchart of an illustrative method for serializing execution of automated test scripts on a group of machines in accordance with one or more aspects of the present disclosure.

FIG. 3 is a flowchart of an illustrative method for serializing execution of automated test scripts on a group of machines in accordance with one or more aspects of the present disclosure. The flowchart in FIG. 3 illustrates the steps that the method is running after being launched on a test execution machine. One or more of the steps may be changed to follow a different protocol. The overall approach allows for cooperatively sharing execution tasks between heterogeneous computers without the need of explicit communication between these computers. The communication may be implicit by sharing the same protocol of updating a central status board.

The process starts and at step 301, the configuration file containing the quality center (QC) instance to point to and what test set to participate in running may be loaded. In step 303, a connection may be made to a QC server using the credentials of a user asked for at launch time. In step 305, a determination may be made as to whether any requests of machine updates have been made at the central repository. If requests of machine updates have been made, the process moves to step 307 where the machine updates may be run if required. If requests of machine updates have not been made in step 305, the process moves to step 309.

In step 309, a determination may be made as to whether a test set execution is permitted or paused. If a test set execution is permitted or paused, the process moves to step 311 where the process may pause for a predetermined time, such as one minute, before returning to step 305. If a test set execution is not permitted or paused, the process moves to step 313. In step 313, a determination may be made as to whether there are test cases left to execute. If not, the process may proceed to step 311. If there are test scripts/cases left to execute, the process may move to step 315 where the next test to run is allocated.

In step 317, the allocated test may be run. Proceeding to step 319, a determination may be made as to whether the test has been completed. If the test has not been completed, the process returns to step 305. If the test has been completed in step 319, the process moves to step 321 where the test is marked as complete before the process returns to step 305.

Figure 4:
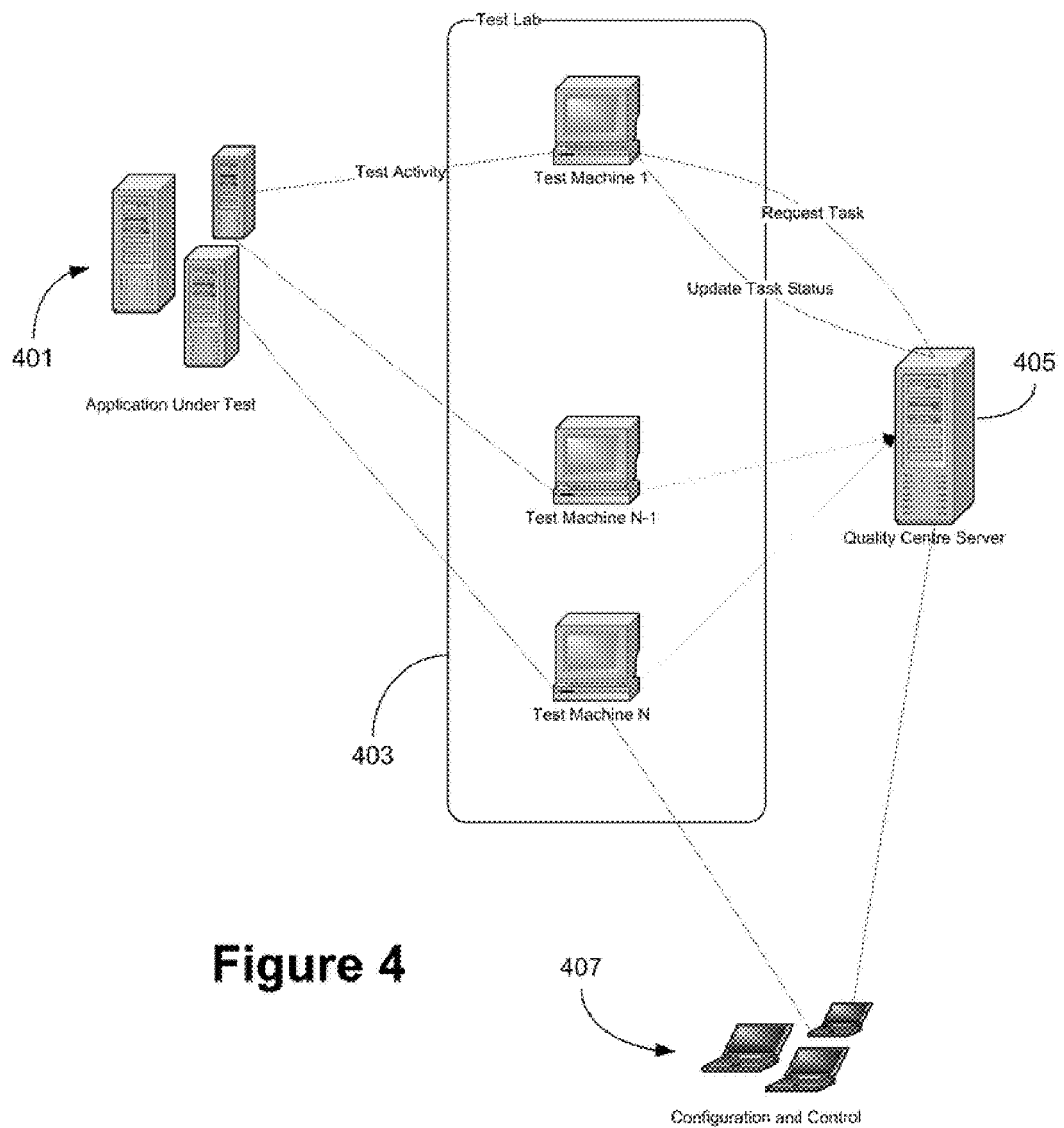
FIG. 4 is an illustrative block diagram of a system for parallelizing execution of automated test scripts on a group of machines and serializing their execution on each machine in accordance with one or more aspects of the present disclosure.

FIG. 4 is an illustrative block diagram of a parallelizing execution of automated test scripts on a group of machines and serializing their execution on each machine in accordance with one or more aspects of the present disclosure. FIG. 4 shows the interaction between operators 407, test execution machines 403, the application under test 401, and a central repository on a Quality Center (QC) 405.

A user may interact both with the test machines 403 and the QC test set. The user may attach or detach a machine from an execution pool 403 by starting an executable with a certain configuration or stopping it. A user may interact with a central repository 405 for creating the test sets indicating what tests the machines 403 will run, configuring each machine's preferences, such as where to save the results, where to expect the test files to be found, what update script to execute if requested, etc.

The test machines 403 may initiate the connection with the central repository 405 and not the other way around, making the solution deployable in a strictly controlled network environment where the running of ad-hoc servers is restricted. The test machine both may request a task and update its status on the central repository 405.

In an alternative embodiment, one or more test machines may receive instruction from a central repository regarding what test script to execute and when. During testing, the test machine in question may periodically send a signal to the central repository to confirm continued proper operation. Such a signal may be sent periodically, such as every specific period of time, such as one minute, or every specific percentage of time. For example, is a test script is scheduled to take 100 hours to run, the test machine in question may send a signal every ten minutes, or after each 10% of the test run is completed. In any manner, the central repository may be configured to know which test machines are operating correctly. If the central repository does not know of a problem with a test machine until the end of the anticipated test time run, a great deal of wasted time may occur. For example, in the example of a test script needing 100 hours to run, if a problem with the test machine occurs after five hours but the central repository does not look at the status until 100 hours, 95 hours of time have been lost where the test script may have been executed on another test machine. By including a system of periodic status checks or inquiries, idle time due to test machines not working properly may be reduced.

In another embodiment, a central repository may be configured to manage the allocation of test scripts to the various machines in order to attempt minimize overall testing time as much as possible. For example, if 200 different test scripts need to be run and each test script is schedule to take a different amount of time to complete, a central repository maintaining the 200 test scripts and in communication with a test machine pool of 10 test machines may be configured to allocate the 200 test scripts across the 10 test machines to ensure the shortest amount of time in completing all 200 tests.

An illustrative example of fewer numbers follows. The present disclosure is not so limited. For example, assume that the pool of test machines is 3 test machines and the total test scripts are 6. Now assume that the test scripts have the following test times:

Test script 1: 50 hours
Test script 2: 60 hours
Test script 3: 5 hours
Test script 4: 55 hours
Test script 5: 2 hours
Test script 6: 1 hour A central repository may initiate test scripts 1, 2, and 4, respectively, on test machines 1, 2, and 3 when initiating the process. Since test script 1 is only scheduled for 50 hours, test machine 1 will finish its testing first. As such, central repository may schedule test script 3 to be executed next on test machine. After that, test machine 1 and 3, completing test scripts 3 and 4, respectively, will complete testing at the same time. Because test machine is still testing, test scripts 5 and 6 may then be allocated to be run on test machines 1 and 3. In the end, all 6 test scripts will be completed in 60 hours time. If such a system of allocation where not implemented, the time for completion of all test scripts may be much longer than the 60 hours minimum for completion in this example.

Figure 5:
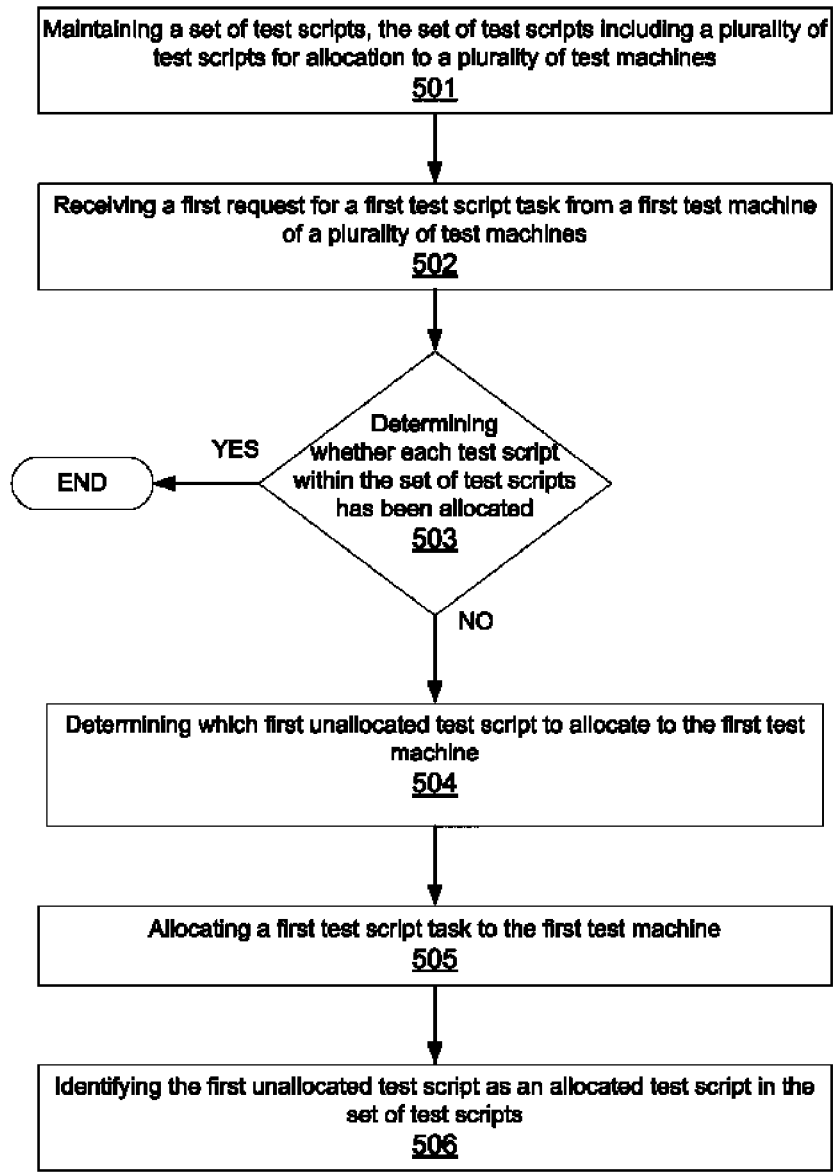
FIG. 5 is a flowchart of an illustrative method for allocating test scripts on a group of machines in accordance with one or more aspects of the present disclosure.

FIG. 5 is a flowchart of an illustrative method for allocating test scripts on a group of machines in accordance with one or more aspects of the present disclosure. The process starts and at 501, a set of test scripts may be maintained, the set of test scripts including a plurality of test scripts for allocation to a plurality of test machines. The set may be maintained at a central repository. A plurality of different sets of test scripts may be maintained and a plurality of underlying test files for use in execution of the various test scripts may be maintained as well.

At 502, a first request for a first test script task may be received from a first test machine of a plurality of test machines. The first request may include information of a particular set of test scripts that the first test machine is configured to execute. At 503, a determination may be made as to whether each test script within the set of test scripts has been allocated, i.e., if all test scripts within the set have been allocated and completed. If all test scripts have been allocated, the process ends. If each test script of the plurality of test scripts has not been allocated, another determination may be made as to which first unallocated test script to allocate to the first test machine at 504.

Proceeding to 505, upon determining which first unallocated test script to allocate to the first test machine, a first test script task may be allocated to the first test machine. The first test script task may include the first unallocated test script. Having allocated the first unallocated test script, the first unallocated test script may be identified as an allocated test script in the set of test scripts at 505. As such, the next time that a request for a test script task is received, from any of the plurality of test machines, the first unallocated test script will not be allocated a second time. In an alternative embodiment, if a determination is made that the first test machine failed to complete execution of the first unallocated test script, whether by test machine error and/or other issue, the identification of the first unallocated test script may be changed to identify it as an available unallocated test script in the set of test scripts.

Aspects of the present disclosure may come with a customized project object for a QC and a standalone program to execute on a test machine. Aspects of the present disclosure answer a problem of efficiency that anyone attempting to automate a large amount of software tests would encounter.

Aspects of the present disclosure may be useful to any company evolving into testing automation over a certain elementary level. Different business structures may use a data base or another repository abstraction.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method comprising:
   maintaining at a central repository a set of test scripts, the set of test scripts including a plurality of test scripts for allocation to a plurality of test machines;
   receiving, at the central repository, a first request for a first test script task from a first test machine of the plurality of test machines;
   determining, by the central repository, whether each test script within the set of test scripts has been allocated;
   if each test script of the plurality of test scripts has not been allocated, determining which first unallocated test script to allocate to the first test machine;
   upon determining which first unallocated test script to allocate to the first test machine, allocating a first test script task to the first test machine, the first test script task including the first unallocated test script;
   identifying, by the central repository, the first unallocated test script as an allocated test script in the set of test scripts;
   periodically receiving, at the central repository, a signal from the first test machine confirming continued proper operation of the first test machine;
   upon determining that the first test machine is not operating properly, identifying, by the central repository, the first unallocated test script as an unallocated test script in the set of test scripts;
   allocating a second test script task to a second test machine, the second test script task including the first unallocated test script.

2. The method of claim 1, further comprising:
   receiving, at the central repository, a second request for a second test script task from a second test machine of the plurality of test machines;
   determining, by the central repository, whether each test script within the set of test scripts has been allocated;
   if each test script of the plurality of test scripts has not been allocated, determining which second unallocated test script to allocate to the second test machine;
   upon determining which second unallocated test script to allocate to the second test machine, allocating a second test script task to the second test machine, the second test script task including the second unallocated test script; and
   identifying, by the central repository, the second unallocated test script as an allocated test script in the set of test scripts.

3. The method of claim 2, further comprising:
   determining, by the central repository, whether the second test machine needs to be updated; and
   if the second test machine needs to be updated, sending, from the central repository, a command to update the second test machine.

4. The method of claim 1, further comprising:
   determining, by the central repository, whether the first test machine needs to be updated; and
   if the first test machine needs to be updated, sending, from the central repository, a command to update the first test machine.

5. The method of claim 1, further comprising:
   receiving, at the central repository, a second request for a second test script task from the first test machine of a plurality of test machines;
   determining, by the central repository, whether each test script within the set of test scripts has been allocated;
   if each test script of the plurality of test scripts has not been allocated, determining which second unallocated test script to allocate to the first test machine;
   upon determining which second unallocated test script to allocate to the first test machine, allocating a second test script task to the first test machine, the second test script task including the second unallocated test script; and
   identifying, by the central repository, the second unallocated test script as an allocated test script in the set of test scripts.

6. The method of claim 1, wherein the signal from the first test machine is received based upon a scheduled time to complete the first test script task.

7. The method of claim 6, wherein the signal is received based upon a percentage of completion of the first test script task.

8. The method of claim 1, wherein determining which first unallocated test script to allocate to the first test machine includes determining the first unallocated test script as an unallocated test script scheduled to take the most scheduled time to complete.

9. One or more non-transitory computer readable storage medium comprising computer executable instructions that, when executed by at least one processor, causes the at least one processor to perform a method comprising:
- maintaining a set of test scripts, the set of test scripts including a plurality of test scripts for allocation to a plurality of test machines;
- receiving a first request for a first test script task from a first test machine of the plurality of test machines;
- determining whether each test script within the set of test scripts has been allocated;
- if each test script of the plurality of test scripts has not been allocated, determining which first unallocated test script to allocate to the first test machine;
- upon determining which first unallocated test script to allocate to the first test machine, allocating a first test script task to the first test machine, the first test script task including the first unallocated test script;
- identifying the first unallocated test script as an allocated test script in the set of test scripts;
- periodically receiving a signal from the first test machine confirming continued proper operation of the first test machine;
- upon determining that the first test machine is not operating properly, identifying the first unallocated test script as an unallocated test script in the set of test scripts;
- allocating a second test script task to a second test machine, the second test script task including the first unallocated test script.

10. The one or more non-transitory computer readable storage medium of claim 9, the method further comprising:
- receiving a second request for a second test script task from a second test machine of the plurality of test machines;
- determining whether each test script within the set of test scripts has been allocated;
- if each test script of the plurality of test scripts has not been allocated, determining which second unallocated test script to allocate to the second test machine;
- upon determining which second unallocated test script to allocate to the second test machine, allocating a second test script task to the second test machine, the second test script task including the second unallocated test script; and
- identifying the second unallocated test script as an allocated test script in the set of test scripts.

11. The one or more non-transitory computer readable storage medium of claim 9, the method further comprising:
- receiving a second request for a second test script task from the first test machine of a plurality of test machines;
- determining whether each test script within the set of test scripts has been allocated;
- if each test script of the plurality of test scripts has not been allocated, determining which second unallocated test script to allocate to the first test machine;
- upon determining which second unallocated test script to allocate to the first test machine, allocating a second test script task to the first test machine, the second test script task including the second unallocated test script; and
- identifying the second unallocated test script as an allocated test script in the set of test scripts.

12. The one or more non-transitory computer readable storage medium of claim 9, wherein the signal from the first test machine is received based upon a scheduled time to complete the first test script task.

13. The one or more non-transitory computer readable storage medium of claim 9, wherein determining which first unallocated test script to allocate to the first test machine includes determining the first unallocated test script as an unallocated test script scheduled to take the most scheduled time to complete.

14. An apparatus, comprising:
- at least one processor; and
- memory storing computer-readable instructions that, when executed by the at least one processor, cause the apparatus to perform:
  - maintaining a set of test scripts, the set of test scripts including a plurality of test scripts for allocation to a plurality of test machines;
  - receiving a first request for a first test script task from a first test machine of the plurality of test machines;
  - determining whether each test script within the set of test scripts has been allocated;
  - if each test script of the plurality of test scripts has not been allocated, determining which first unallocated test script to allocate to the first test machine;
  - upon determining which first unallocated test script to allocate to the first test machine, allocating a first test script task to the first test machine, the first test script task including the first unallocated test script;
  - identifying the first unallocated test script as an allocated test script in the set of test scripts;
  - periodically receiving a signal from the first test machine confirming continued proper operation of the first test machine;
  - upon determining that the first test machine is not operating properly, identifying the first unallocated test script as an unallocated test script in the set of test scripts;
  - allocating a second test script task to a second test machine, the second test script task including the first unallocated test script.

15. The apparatus of claim 14, the memory further storing computer-readable instructions that, when executed by the at least one processor, cause the apparatus to perform:
- receiving a second request for a second test script task from a second test machine of the plurality of test machines;
- determining whether each test script within the set of test scripts has been allocated;
- if each test script of the plurality of test scripts has not been allocated, determining which second unallocated test script to allocate to the second test machine;
- upon determining which second unallocated test script to allocate to the second test machine, allocating a second test script task to the second test machine, the second test script task including the second unallocated test script; and
- identifying the second unallocated test script as an allocated test script in the set of test scripts.

16. The apparatus of claim 14, wherein determining which first unallocated test script to allocate to the first test machine includes determining the first unallocated test script as an unallocated test script scheduled to take the most scheduled time to complete.

* * * * *